(12) United States Patent
Ellis et al.

(10) Patent No.: US 8,076,407 B2
(45) Date of Patent: Dec. 13, 2011

(54) HOT MELT ADHESIVE

(75) Inventors: Richard J. Ellis, Bucks (GB); Michaela Stolbova, Slough (GB)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 12/028,424

(22) Filed: Feb. 8, 2008

(65) Prior Publication Data

US 2009/0203847 A1 Aug. 13, 2009

(51) Int. Cl.
*C09J 123/10* (2006.01)

(52) U.S. Cl. ........ 524/515; 524/502; 524/504; 524/487; 525/221; 525/240; 525/285; 525/74

(58) Field of Classification Search .................... 525/74, 525/221, 240, 285; 524/502, 504, 487, 515
See application file for complete search history.

(56) References Cited

U.S. PATENT DOCUMENTS

| | | | |
|---|---|---|---|
| 5,441,999 A | 8/1995 | Jarvis et al. | |
| 5,747,573 A | 5/1998 | Ryan | |
| 5,763,516 A | 6/1998 | Godfrey | |
| 5,998,547 A | 12/1999 | Hohner | |
| 2002/0127389 A1* | 9/2002 | Hanada et al. | 428/319.9 |
| 2004/0115456 A1* | 6/2004 | Kanderski et al. | 428/500 |
| 2004/0127614 A1* | 7/2004 | Jiang et al. | 524/270 |
| 2004/0249046 A1* | 12/2004 | Abhari et al. | 524/474 |
| 2005/0042469 A1 | 2/2005 | Gong et al. | |
| 2005/0106385 A1 | 5/2005 | Martin et al. | |
| 2007/0021566 A1 | 1/2007 | Tse et al. | |
| 2008/0306194 A1 | 12/2008 | Sun et al. | |

FOREIGN PATENT DOCUMENTS

| | | |
|---|---|---|
| JP | 03-002281 | 1/1991 |
| WO | 2006015201 | 2/2006 |
| WO | 2007079092 | 7/2007 |

OTHER PUBLICATIONS

"Evonik Degussa VESTOPLAST@828 Amorphous Polyalphaolefin". Retrieved from www.matweb.com on Apr. 8, 2009.

* cited by examiner

*Primary Examiner* — Vasu Jagannathan
*Assistant Examiner* — Mark Kaucher
(74) *Attorney, Agent, or Firm* — Sun Hee Lehmann

(57) ABSTRACT

Hot melt adhesives are provided that have improved heat resistance. The adhesives comprise a metallocene polyolefin, an amorphous α-olefin polymer, a tackifier and a functional polyolefin. The functional polyolefin is used in an amount sufficient to increase the heat resistance. A preferred functional polyolefin is a maleated polyolefin such as maleated polypropylene. A preferred tackifier is a hydrogenated hydrocarbon tackifier.

8 Claims, 2 Drawing Sheets

HOT MELT ADHESIVE

FIELD OF THE INVENTION

Figure 1:
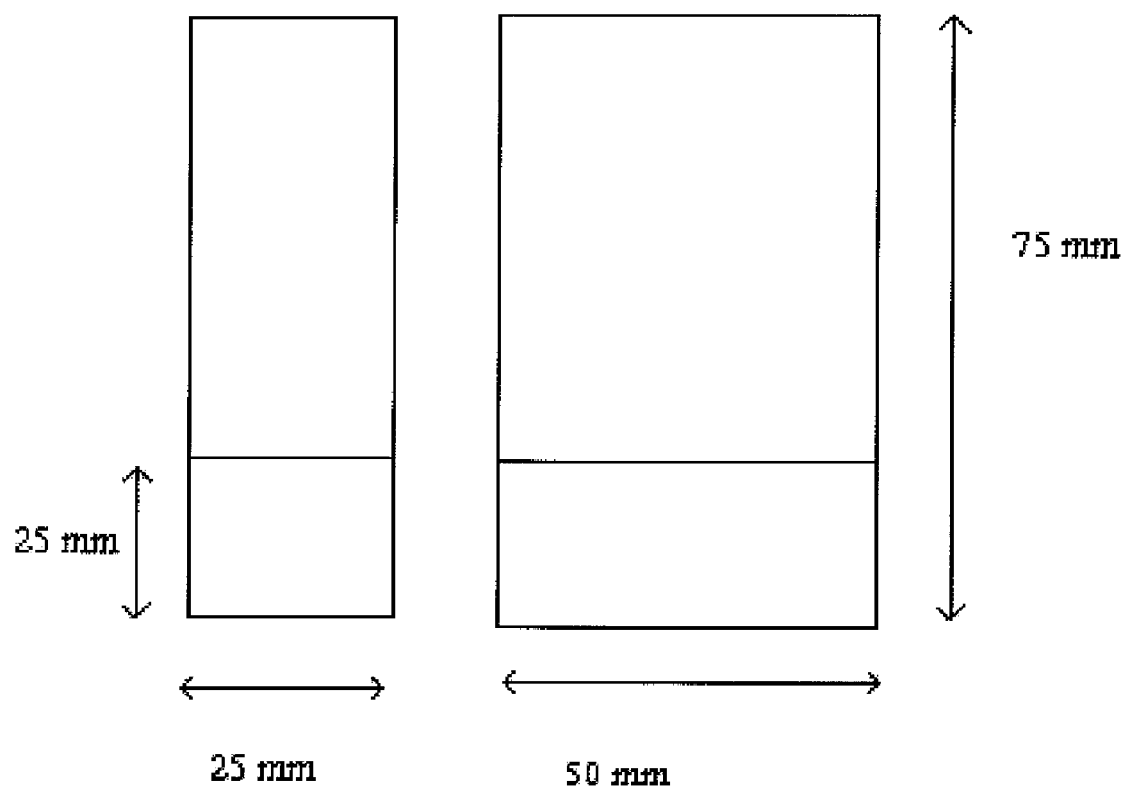

The invention relates to a hot melt adhesive formulation that comprises a maleated polyethylene and/or maleated polypropylene. The adhesive of the invention shows improved heat resistance.

BACKGROUND OF THE INVENTION

Hot melt adhesives ("HMAs") are ubiquitous in many areas of commerce including consumer and industrial packaging where a bond is required between a substrate and a second item. HMAs are routinely used in the manufacture of corrugated cartons, boxes, cereal boxes and the like. They are also used in diverse areas, such as bookbinding; sealing the ends of paper bags; furniture manufacturing; manufacture of particleboard, linerboard, various other paper goods, and for adhering other articles, such as glass, metals and various plastics, including attaching paper labels to plastic containers. Additional uses of hot-melt adhesives include, for example only, lamination, product assembly, and non-woven construction applications.

Because of these diverse applications, hot melt adhesives may be required to maintain a strong bond over a wide range of temperature conditions. For example, in the manufacture of corrugated cartons used for shipping refrigerated or frozen foods, or foods packed in ice, hot melt adhesives are generally selected because of their ability to maintain a strong bond under low temperature conditions. However in other applications the hot melt adhesive may have to maintain a strong bond to the substrate under extremes of stress and shock in handling, and high temperatures and humidity. Foods or beverages for example are often packaged by warm or hot filling. Moreover cases and cartons often encounter very high temperatures when trucked, so adhesives having sufficiently good heat resistance are required in these applications. "Sufficiently good heat resistance" is to be understood to mean that the cured adhesive does not immediately soften when acted upon by elevated temperature, with the result that the adhesive bond loosens and/or the bonded parts shift with respect to one another.

There continues to be a need in the art for hot melt compositions that have high heat resistance. The current invention addresses this need in the art.

SUMMARY OF THE INVENTION

The invention provides novel hot melt adhesive formulations, methods of using the adhesive to bond substrates together, and to articles of manufacture comprising the adhesive.

The invention provides a hot melt adhesive comprising a thermoplastic base polymer, a tackifier and a functionalized polyolefin. The functional polyolefin is used in an amount effective to increase the heat resistance of the adhesive. In one embodiment, the functional polyolefin is a maleated polyethylene or maleated polypropylene. In one particularly preferred embodiment the adhesive comprises a metallocene polypropylene, an amorphous α-olefin polymer, a maleated polyethylene or polypropylene and a hydrogenated hydrocarbon tackifier.

The invention further provides a method of increasing the heat resistance of a hot melt adhesive composition. The method comprises adding to an adhesive composition an amount of a functional polyolefin effective to increase the heat resistance of the composition.

The invention further provides a process for bonding a substrate to a similar or dissimilar substrate comprising applying to at least a first substrate a molten hot melt adhesive composition, bringing a second substrate in contact with the composition applied to the first substrate, and allowing the composition to solidify, whereby the first and second substrates are bonded together, said hot melt adhesive comprising a thermoplastic base polymer, a tackifier and a functionalized polyolefin.

The invention also provides article of manufacture prepared using the adhesives of the invention.

BRIEF DESCRIPTION OF THE DRAWING FIGURES

Figure 2:
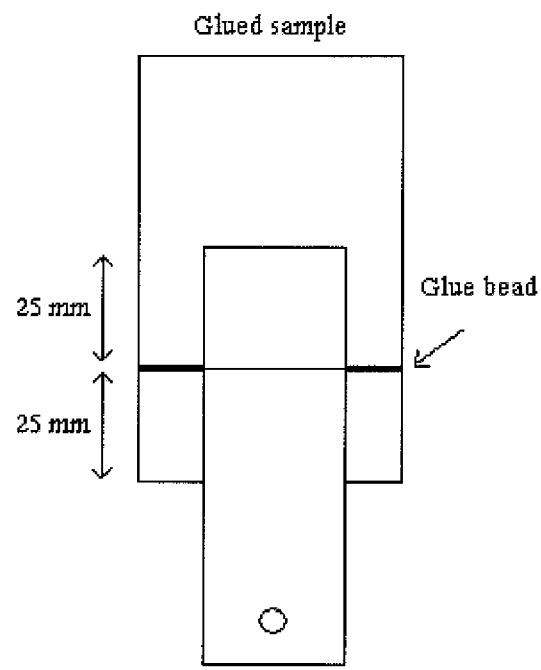
Figure 3:
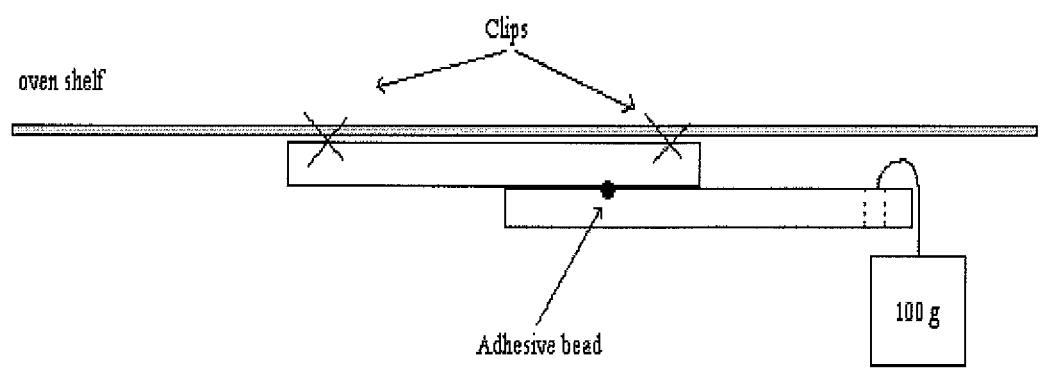

FIGS. 1-3 are diagrams illustrating placement of the adhesive bead and other dimensional parameters used to measure the heat resistance of an adhesive bond.

DETAILED DESCRIPTION OF THE INVENTION

All documents cited herein are incorporated in their entireties by reference.

It has been discovered that functional polyolefins, such as maleated polyethylenes and maleated polypropylenes, can be used as an additive to increase the heat resistance of hot melt adhesives. Hot melts having substantially higher heat resistance can be formulated. Formulations having high heat resistance, in particular heat resistance of greater that 100° C. may advantageously be used as a substitute for moisture curable hot melt adhesives in certain end use applications that conventionally use moisture reactive formulations.

The adhesive base copolymer will typically be used in amounts of from about 20 wt % to about 75 wt %, more typically from about 30 wt % to about 60 wt %, as the main base adhesive polymer component. By "main" or "base" polymer component means the adhesive polymer component present in the largest amount of the adhesive. It will be appreciated that other polymeric additives may, if desired, be added to the adhesive formulation.

Any base polymer suitable for use in formulating hot melt adhesives, as are well known to those skilled in the art, may be used in the practice of the invention. Such polymers include amorphous polyolefins, ethylene-containing polymers and rubbery block copolymers, as well as blends thereof. Base polymers include but are not limited to ethylene vinyl acetate (EVA), ethylene n-butyl acrylate (EnBA), ethylene ethyl hexyl acrylate (EEHA), metallocene polyolefins, functional metallocene polyolefins, amorphous α-olefins and various mixtures of compatible polymers. A compatible polymer is defined herein as any polymer that has the ability to mix without objectionable separation, i.e., without adversely affecting the performance of the formulated adhesive.

In one preferred embodiment of the invention, the adhesive comprises two major polymer components.

One major polymer component is a metallocene polyolefin. Typical formulations will comprise from about 5 to about 50 wt %, more typically from about 10 to about 50 wt %, based on the total weight of the adhesive formulation, of this type of polymer component.

Metallocene polyethylene polymers, for example, may be obtained through polymerizing ethylene monomer with α-olefin (e.g., butene, hexene, octene) using metallocene catalytic system. Commercial sources of metallocene polyethylene polymers and metallocene polypropylene polymers include Exxon Mobil Corporation (under the trade name Exact), Dow Chemical (under the trade name Affinity polymer) and Clariant (under the trade name Licocene). Also useful are metallocene polyethylene polymers in which a functional group or functionalizing component, herein used interchangeable, is grafted onto the metallocene polyethylene polymers to form a functionalized metallocene polyethylene polymer. Functional groups that can be used in the practice of the invention include acrylic acid, acetate, sulfonate, maleic anhydride, fumaric acid, and others. Useful functionalized metallocene polyethylene polymer for the adhesives include acrylic acid functionalized metallocene polyethylene polymer, acetate functionalized metallocene polyethylene polymer, sulfonate functionalized metallocene polyethylene polymer, maleic anhydride functionalized metallocene polyethylene polymer, and fumaric acid modified metallocene polyethylene polymer. Metallocene polyethylene polymers suitable for the invention will have molecular weight greater than 1500 daltons.

The second major polymer component is a soft or rubbery polymer having a glass transition temperature (Tg) below 20°, preferably below 0° C. and most preferably below −10° C. Typical formulations will comprise from about 20 to about 50 wt %, based on the total weight of the adhesive formulation, of this type of polymer component.

It shall be understood that the soft or rubbery polymer herein mentioned refers to either a class of low molecular weight, essentially amorphous α-olefin polymers known as APAO, or a class of soft, high molecular weight, low tensile strength polymeric materials conventionally known as synthetic rubber, which includes, but not limited to, ethylene-propylene rubber (EPR), ethylene-propylene-diene rubber (EPDM), butyl rubber, polyisoprene, polybutadiene, styrene-butadiene rubber (SBR), and styrene-isoprene rubber (SIR).

The APAO polymers useful in the present invention consists of several different categories of atactic, low molecular weight, low melt viscosity, and essentially amorphous propylene based polymers. These polymers are well known to those skilled in the art and can be either homopolymers of propylene or copolymers of propylene with one or more α-olefin comonomer, such as, for example, ethylene, butene-1, hexene-1 and octene-1. The average weight molecular weight of the APAO polymers in the scope of the present invention is in the range of from about 1,000 to about 300,000 g/mol, preferably from about 10,000 to about 100,000 g/mol. The said polymers have advantageously a softening point between about 80 and 170° C. and a glass transition temperature from about −5 to −40° C. Although any APAO polymer falling in the range of physical properties herein described above can be used, the most preferred APAO is selected from the group consisting of propylene homopolymer, propylene-ethylene copolymer, propylene-butene-1 copolymer and propylene-ethylene-butene-1 terpolymer. The APAO polymers of the types herein described above are commercially available from Eastman Chemical Company, under the trade name designation Eastoflex or from Huntsman Corporation, under the trade name designation Rexflex or from Evonik Degussa Corporation, under the trade name designation Vestoplast.

Adhesives of the invention will comprise a functional polyolefin. This component will be used in an amount effective to increase heat resistance. Desired heat resistance will depend on the adhesive formulation and the end use application. The function polyolefin component will typically be used in amounts of from abut 0.1 to about 15 wt % or more, more typically this component will be used in amounts of from about 0.5 to about 10 wt %, based on the total weight of the adhesive formulation. The functional polyolefin will typically be added to a hot melt adhesive formulation in an amount effective to increase the heat resistance of the hot melt at least by 5° C. or more. Increases in heat resistance of at least 10° C., and up to 40° C. or more can be achieved.

Representative examples of suitable polyolefins include homopolymers and copolymers of various olefins such as ethylene, propylene, butylene, pentene, hexylene, heptene and octene. Suitable monomers for preparing functionalized polyolefin are, for example, olefinically unsaturated monocarboxylic acids of less than 12 carbon atoms, e.g., acrylic acid or methacrylic acid, and the corresponding tert-butyl esters, e.g., tert-butyl(meth)acrylate, olefinically unsaturated dicarboxylic acids of less than 12 carbon atoms, e.g., fumaric acid, maleic acid, and itaconic acid and the corresponding mono- and/or di-tert-butyl esters, e.g., mono- or di-tert-butyl fumarate and mono- or di-tert-butyl maleate, olefinically unsaturated dicarboxylic anhydrides of less than 12 carbon atoms, e.g., maleic anhydride, sulfo- or sulfonyl-containing olefinically unsaturated monomers of less than 12 carbon atoms, e.g., p-styrenesulfonic acid, 2-(meth)acrylamide-2-methylpropenesulfonic acid or 2sulfonyl(meth)acrylate, oxazolinyl-containing olefinically unsaturated monomers of less than 12 carbon atoms, e.g., vinyloxazolines and vinyloxazoline derivatives, and epoxy-containing olefinically unsaturated monomers of less than 12 carbon atoms, e.g., glycidyl (meth)acrylate or allyl glycidyl ether.

In one exemplary embodiment, the monomer used for preparing the functionalized polyolefin will be maleic anhydride while the polyolefin will be polypropylene. Hence, in one exemplary embodiment, the functionalized polyolefin used in the practice of the invention is a maleated polypropylene.

Maleated polypropylene is commercially available, being manufactured by a number of producers. For example, a suitable maleated polypropylene is available from Eastman Chemical under the name EPOLENE E-43.

A variety of maleated polyolefins suitable for use herein are available commercially and/or are obtainable using known procedures. For example, maleated polyethylenes are available from Honeywell under the trade names A-C 575 and A-C 573, and from DuPont as products listed as part of their Fusabond E series. Maleated polypropylenes are available from Honeywell under the trade names A-C 596 and A-C 597, from DuPont as products listed under the Fusabond P trade named series, and from Eastman under the trade names E-43, G-3015, and G-3003. Any of a variety of known procedures for producing maleated polyolefins from precursor compounds can be adapted for use to make starting materials suitable for use herein. For example, U.S. Pat. No. 7,256,236, incorporated herein by reference, discloses certain preferred methods for producing maleated polypropylenes suitable for use herein.

The hot melt adhesives of the invention will also comprise a compatible tackifier. The tackifier component will typically be used in amounts of from about 30 to about 60 wt %, based on the total weight of the adhesive formulation.

Tackifying resins useful in the present invention include aliphatic, cycloaliphatic and aromatic hydrocarbons and modified hydrocarbons and hydrogenated versions; terpenes and modified terpenes and hydrogenated versions; and rosins and rosin derivatives and hydrogenated versions; and mixtures thereof. These tackifying resins have a ring and ball softening point from 70° C. to 150° C., and will typically have a viscosity at 350° F. (177° C.), as measured using a Brookfield viscometer, of no more than 2000 centipoise. They are also available with differing levels of hydrogenation, or saturation, which is another commonly used term. Useful examples include Eastotac™ H-100, H-115 and H-130 from Eastman Chemical Co., which are partially hydrogenated cycloaliphatic petroleum hydrocarbon resins with softening points of 100° C., 115° C. and 130° C., respectively. These are available in the E grade, the R grade, the L grade and the W grade, indicating differing levels of hydrogenation with E being the least hydrogenated and W being the most hydrogenated. The E grade has a bromine number of 15, the R grade a bromine number of 5, the L grade a bromine number of 3 and the W grade has a bromine number of 1. Eastotac™ H-142R from Eastman Chemical Co. has a softening point of about 140° C. Other useful tackifying resins include Escorez™ 5300, 5400 and 5637, partially hydrogenated cycloaliphatic petroleum hydrocarbon resins, and Escorez™ 5600, a partially hydrogenated aromatic modified petroleum hydrocarbon resin all available from Exxon Chemical Co.; WINGTACK® Extra, which is an aliphatic, aromatic petroleum hydrocarbon resin available from Sartomer; WINGTACK® 95, an aliphatic C-5 petroleum hydrocarbon resin available from Sartomer; and Regalite R9001 and Regalite S5100, a hydrogenated hydrocarbon resins with different degree of hydrogenation, available from Eastman Chemical Company.

There are numerous types of rosins and modified rosins available with differing levels of hydrogenation including gum rosins, wood rosins, tall-oil rosins, distilled rosins, dimerized rosins and polymerized rosins. Some specific modified rosins include glycerol and pentaerythritol esters of wood rosins and tall-oil rosins. Commercially available grades include, but are not limited to, Sylvatac™ RE103, a pentaerythritol rosin ester available from Arizona Chemical Co., Permalyn™ 5110, an pentaerythritol modified rosin available from Eastman Chemical Company and Foral 105 which is a highly hydrogenated pentaerythritol rosin ester also available from Eastman Chemical Company. Other examples include Sylvatac™ RE85 and RE95, which are 85° C. and 95° C. melt point rosin esters, Sylvaros PR 295 and Sylvaros PR 140, which are polymerized and modified rosins, and Sylvares TP2040 is a phenolic modified terpene resin available from Arizona Chemical Co. and Foral AX-E is a 80° C. melt point hydrogenated rosin acid available from Eastman Chemical Company. Another exemplary tackifier, Piccotac 1115, has a viscosity at 350° F. (177° C.) of about 1600 centipoise. Other typical tackifiers have viscosities at 350° F. (177° C.) of much less than 1600 centipoise, for instance, from 50 to 300 centipoise.

The adhesives may, if desired, also comprise a wax.

Waxes suitable for use in the present invention include paraffin waxes, microcrystalline waxes, polyethylene waxes, polypropylene waxes, by-product polyethylene waxes, Fischer-Tropsch waxes, oxidized Fischer-Tropsch waxes and functionalized waxes such as hydroxy stearamide waxes and fatty amide waxes. High density low molecular weight polyethylene waxes, by-product polyethylene waxes and Fischer-Tropsch waxes are conventionally referred to in the art as synthetic high melting point waxes. Modified waxes, including vinyl acetate modified waxes such as AC-400 (Honeywell) and MC-400 (available from Marcus Oil and Company), maleic anhydride modified waxes such as Epolene C-18 (available from Eastman Chemical) and AC-575A and AC-575P (available from Honeywell) and oxidized waxes are also useful in the practice of the invention. Callista® 122, 158, 144, 435, and 152 available from Shell Lubricants, Houston, Tex.; Sasolwax C80 and Sasolwax H-1, H-4 and H-8, Fischer-Tropsch waxes available from Sasol Wax are also preferred waxes for use in the practice of the invention.

Paraffin waxes that can be used in the practice of the invention include Pacemaker® 30, 32, 35, 37, 40, 42, 45 & 53 available from Citgo Petroleum, Co.; Astor Okerin® 236 available from Honeywell; R-7152 Paraffin Wax available from Moore & Munger; R-2540 available from Moore and Munger; and other paraffinic waxes such as those available from Sasol Wax under the product designations Sasolwax 5603, 6203 and 6805.

The microcrystalline waxes useful here are those having 50 percent by weight or more cyclo or branched alkanes with a length of between 30 and 100 carbons. They are generally less crystalline than paraffin and polyethylene waxes, and have melting points of greater than about 70° C. Examples include Victory® Amber Wax, a 70° C. melting point wax available from Baker Petrolite Corp.; Bareco® ES-796 Amber Wax, a 70° C. melt point wax available from Bareco; Besquare® 175 and 195 Amber Waxes and 80° C. and 90° C. melt point microcrystalline waxes both available from Baker Petrolite Corp.; Indramic® 91, a 90° C. melt point wax available from Industrial Raw Materials; and Petrowax® 9508 Light, a 90° C. melt point wax available from Petrowax. Other examples of microcrystalline waxes are Sasolwax 3971 available from Sasol Wax and Microwax K4001 available from Alfred Kochem GmBH.

Exemplary high density low molecular weight polyethylene waxes falling within this category include ethylene homopolymers available from Backer Petrolite Corp. as Polywax™ 500, Polywax™ 1500 and Polywax™ 2000. Polywax™ 2000 has a molecular weight of approximately 2000, an Mw/Mn of approximately 1.0, a density at 16° C. of about 0.97 g/cm$^3$, and a melting point of approximately 126° C.

When used, the wax component will typically be present in amounts of up to about 45 wt %. Formulation comprising a wax component will more typically comprise from about 5 to about 40 wt %. Preferred waxes have a melt temperature between 120° F. and 250° F., more preferably between 150° F. and 230° F., and most preferable between 180° F. and 220° F.

The adhesives of the present invention may desirably also contain a stabilizer or antioxidant. These compounds are added to protect the adhesive from degradation caused by reaction with oxygen induced by such things as heat, light, or residual catalyst from the raw materials such as the tackifying resin.

Among the applicable stabilizers or antioxidants included herein are high molecular weight hindered phenols and multifunctional phenols such as sulfur and phosphorous-containing phenol. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency, and correspondingly, its reactivity; this hindrance thus providing the phenolic compound with its stabilizing properties. Representative hindered phenols include; 1,3,5-trimethyl-2,4,6-tris-(3,5-di-tert-butyl-4-hydroxybenzyl)-benzene; pentaerythrityl tetrakis-3(3,5-di-tert-butyl-4-hydroxyphenyl)-propionate; n-octadecyl-3(3,5-di-tert-butyl-4-hydroxyphenyl)-propionate; 4,4'-methylenebis(2,6-tert-butyl-phenol); 4,4'-thiobis(6-tert-butyl-o-cresol); 2,6-di-tertbutylphenol; 6-(4-hydroxyphenoxy)-2,4-bis(n-octyl-thio)-1,3,5 triazine; di-n-octylthio)ethyl 3,5-di-tert-butyl-4-hydroxy-benzoate; and sorbitol hexa[3-(3,5-di-tert-butyl-4-hydroxy-phenyl)-propionate].

The performance of these antioxidants may be further enhanced by utilizing, in conjunction therewith, known synergists such as, for example, thiodipropionate esters and phosphites. Distearylthiodipropionate is particularly useful. These stabilizers, if used, are generally present in amounts of about 0.1 to 1.5 weight percent, preferably 0.25 to 1.0 weight percent.

Such antioxidants are commercially available from Ciba Specialty Chemicals and include Irganox® 565, 1010, 1076 and 1726 which are hindered phenols. These are primary antioxidants which act as radical scavengers and may be used alone or in combination with other antioxidants such as phosphite antioxidants like Irgafos® 168 available from Ciba Specialty Chemicals. Phosphite catalysts are considered secondary catalysts and are not generally used alone. These are primarily used as peroxide decomposers. Other available catalysts are Cyanox® LTDP available from Cytec Industries and Ethanox® 330 available from Albemarle Corp. Many such antioxidants are available either to be used alone or in combination with other such antioxidants. These compounds are added to the hot melts in small amounts and have no effect on other physical properties. Other compounds that could be added that also do not affect physical properties are pigments which add color, or fluorescing agents, to mention only a couple. Additives like these are known to those skilled in the art.

Depending on the contemplated end uses of the adhesives, other additives such as plasticizers, pigments, dyestuffs and fillers conventionally added to hot melt adhesives may be included. In addition, small amounts of additional tackifiers and/or waxes such as microcrystalline waxes, hydrogenated castor oil and vinyl acetate modified synthetic waxes may also be incorporated in minor amounts, i.e., up to about 10% by weight, into the formulations of the present invention.

The adhesive compositions of the present invention are prepared by blending the components in the melt at a temperature of above about 140° C. to about 200° C. until a homogeneous blend is obtained. Two hours is usually sufficient. Various methods of blending are known in the art and any method that produces a homogeneous blend is satisfactory.

It will be appreciated that formulations can be tailored for specific end use application. Formulations for packaging and bookbinding will typically have a viscosity of from about 700 cP to about 10,000 cP at 180° C. Formulations for woodworking applications would preferably have a higher viscosity of, e.g., up to about 60,000 cP at 180° C.

In addition to providing the art with novel adhesive formulations, the invention provides the art with a method of increasing the heat resistance of a hot melt adhesive, with a method of bonding one substrate to another substrate, and to articles of manufacture comprising the adhesives of the invention.

In one embodiment of the invention, a method of increasing the heat resistance of a hot melt adhesive composition is provided. The method comprises adding to a hot melt adhesive composition an amount of a functional polyolefin effective to increase the heat resistance of the composition. The method of the invention can be used to increase the heat resistance of a hot melt adhesive formulation at least by 5° C. or more. Formulations showing an increase in heat resistance of least 1° C., at least 20° C., at least 30° C., at least 40° C. and at least 5° C. or more can be achieved in accordance with the practice of the invention.

In another embodiment of the invention, a method for bonding a substrate to a similar or dissimilar substrate is provided. The method comprises applying to at least a first substrate a molten hot melt adhesive composition, bringing a second substrate in contact with the composition applied to the first substrate, and allowing the composition to solidify, whereby the first and second substrates are bonded together, wherein the hot melt adhesive composition comprises thermoplastic base polymer, a tackifier and a functionalized polyolefin.

Still other embodiments of the invention provides the art with various articles of manufacture prepared using hot melt adhesives that contain a functional polyolefin.

The hot melt adhesives of the invention find use in, for example, packaging, converting, cigarette manufacture, bookbinding, bag ending, wood working and in nonwoven markets.

Because of the high heat resistance, the adhesives of the invention may advantageously be used in bookbinding applications where moisture curing hot melt adhesives are currently being used.

The adhesive is also particularly useful in the manufacture of nonwoven articles. The adhesives may be used as construction adhesives, as positioning adhesives, and in elastic attachment applications in the manufacture of, e.g., diapers, feminine hygiene pads (which include conventional sanitary napkins and panty liners) and the like.

Use of the term wood working is used broadly herein to refer to articles that comprise a wood material. It is to be understood that term "wood" is being used generically and encompasses all types of wood as well as wood-containing composites, engineered wood, particle board and the like. Wood working applications include, for example, use in the manufacture of flooring, laminated countertops, doors, furniture and the like. The adhesive of the invention may advantageously be used to bond one wooden substrate (i.e., wood, wood composite or the like) to a second substrate, which may or may not be a wooden substrate.

The adhesives find particular use as case, carton, and tray forming adhesives, and as sealing adhesives, including heat sealing applications, for example in the packaging of cereals, cracker and beer products. Encompassed by the invention are containers, e.g., cartons, cases, boxes, bags, trays and the like, wherein the adhesive is applied by the manufacturer thereof prior to shipment to the packager. Following packaging, the container is heat sealed.

In packaging end use applications, substrates to be bonded include virgin and recycled kraft, high and low density kraft, chipboard and various types of treated and coated kraft and chipboard. Composite materials are also used for packaging applications such as for the packaging of alcoholic beverages. These composite materials may include chipboard laminated to an aluminum foil which is further laminated to film materials such as polyethylene, mylar, polypropylene, polyvinylidene chloride, ethylene vinyl acetate and various other types of films. Additionally, these film materials also may be bonded directly to chipboard or kraft. The aforementioned substrates by no means represent an exhaustive list, as a tremendous variety of substrates, especially composite materials, find utility in the packaging industry.

Hot melt adhesives for packaging are generally extruded in bead form onto a substrate using piston pump or gear pump extrusion equipment. Hot melt application equipment is available from several suppliers including Nordson, ITW and Slautterback. Wheel applicators are also commonly used for applying hot melt adhesives, but are used less frequently than extrusion equipment.

The following examples are provided for illustrative purposes only. All parts in the formulation are by weight.

EXAMPLES

Adhesive Samples 1-16 were prepared in a single blade mixer heated to 140 to about 180° C. by mixing the components shown in the Tables together until homogeneous.

Melt viscosities of the hot melt adhesives were determined on a Brookfield Model RVT Thermosel viscometer using a number 27 spindle, 20 rpm.

Heat stress is defined as being the temperature at which a stressed bond fails. In the examples that follow heat stress, or the ability of a hot melt to withstand elevated temperature under cleavage forces (also referred to herein as cleavage heat stress) was used to measure heat resistance.

Cleavage heat stress was measured using the following protocol:

1. Four pieces of board 75 mm×25 mm and 75 mm×50 mm were cut from corrugated board with the fluting running parallel to the longest edge. On both sides of board a line was drawn 22 mm from the end as indicated in FIG. 1.
2. Approximately 100 g of hot melt in a small metal container was heated at the application temperature.
3. The adhesive was stirred with a spatula to ensure even heat distribution, the spatula was then lifted out of the adhesive to produce a stream of adhesive in the container. This process was repeated for each sample.
4. The 50 mm board is passed under the stream of adhesive to give a bead width of 3 mm along the 25 mm line as shown in FIG. 1 (the speed with which the board is moved will determine the bead width).
5. The 25 mm board was taken and bonded same side to same side lining up 25 mm mark to that of 50 mm board's 25 mm mark as shown in FIG. 2. The 25 mm board is positioned in the center of the 50 mm board leaving uncompressed hot melt adhesive either side, this uncompressed adhesive once cooled can be used to check that the bead width is ±3 mm.
6. The bond is formed within 3 sec and a 100 g weight placed on the bond area to ensure even bonding pressure. The bond was left at least 24 hours before testing.
7. The 25 mm board end of the bonded sample was hole-punched to allow a 100 g weight to be hung from it. The sample was attached by the 50 mm piece of board in an oven so that it was horizontal to the oven shelf with the 25 mm board facing down using three bulldog clips and a 100 weight was attached to it as shown FIG. 3.
8. The oven was turned on and set at a temperature of 40° C. and left for 20 min. The oven temperature after the initial 20 minutes was raised by 3° C. every 15 minutes. The oven temperature noted when the sample fails represents the heat resistance of the sample.

In the following examples:

A-C® 573 and A-C® 575 are maleated polyethylene polymers commercially available from Honeywell. These products differ in the mount of grafted maleic anhydride. The A-C® 575 product contains greater amounts of grafted maleic anhydride.

A-C® 596 and A-C® 597 are maleated polypropylene polymers commercially available from Honeywell. These products differ in the mount of grafted maleic anhydride. The A-C® 597 product contains greater amounts of grafted maleic anhydride.

Arkon P 100 is an hydrogenated hydrocarbon tackifier having a softening point of about 100° C. (Arakawa Chemical Industries, Ltd.).

Arkon P115 is an hydrogenated hydrocarbon tackifier having a softening point of about 115° C. (Arakawa Chemical Industries, Ltd.).

EVA 400-28 is Escorene Ultra UL 40028 is an ethylene-vinyl acetate copolymer having a melt index of 400 g/10 min and a vinyl acetate content of 28% (Exxon Mobil Corp).

EVA 25-28 is Escorene Ultra UL 02528 is an ethylene-vinyl acetate copolymer having a melt index of 25 g/10 min and a vinyl acetate content of 27.5% (Exxon Mobil Corp).

Escorex 5400 is a hydrogenated dicyclopentadiene tackifying resin having a softening point of 100 to 106° C. (ExxonMobil Chemical Company).

Evernox—10 is an anti-oxidant (Everspring Chemical Co.).

Irganox 1010 is an anti-oxidant (Ciba Specialty Chemicals).

Kristalex F85 is an α-methyl styrene resin having a softening point of 85° C. (Eastman Chemical Company).

Licocene® PP 1302, Licocene® PP 1502, Licocene® PP 2602 and Licocene® PP 6102 are grades of metallocene polypropylene copolymer commercially available from Clariant. These grades differ in viscosity and crystallinity.

Regalite R1090 is a hydrogenated hydrocarbon tackifying resin with a softening point of 90° C. (Eastman Chemical Company).

Sasolwax H1 is a Fischer-Tropsch wax (Sasol Wax).

Sasolwax 6805 is a paraffin wax (Sasol Wax).

Vestoplast 828 is an APAO (Eastman Chemical Company).

Example 1

Hot melt adhesive formulations having the ingredients shown in Table 1 where prepared and heat resistance compared.

TABLE 1

|  | Sample 1 | Sample 2 |
| --- | --- | --- |
| A-C 596 |  | 3 |
| Licocene PP 1302 | 30 | 30 |
| Arkon P 1000 | 35 | 35 |
| Vestoplast 828 | 34.7 | 34.7 |
| Irganox 1010 | 0.3 | 0.3 |
| Average (x = 4) heat stress cleavage | 53.75 | 104.5 |
| Viscosity cP @170° C. | 3145 | 3020 |
| @180° C. | 2375 | 2295 |

Results show that in the presence of maleated polyolefin (Sample 2), there was a significant increase in heat resistance.

Example 2

Hot melt adhesive formulations having the ingredients shown in Table 2 where prepared and heat resistance compared.

TABLE 2

|  | Sample 3 | Sample 4 |
| --- | --- | --- |
| A-C 573 |  | 5 |
| Licocene PP 1302 | 25 | 25 |
| Regalite R1090 | 35 | 35 |
| Vestoplast 828 | 39.7 | 34.7 |
| Irganox 1010 | 0.3 | 0.3 |
| Average (x = 4) heat stress cleavage | 49.75 | 65 |
| Viscosity cP @ 180° C. | 2750 | 1925 |

Results show that in the presence of maleated polyolefin (Sample 4), there was a significant increase in heat resistance.

Example 3

Hot melt adhesive formulations having the ingredients shown in Table 3 where prepared and heat resistance compared.

TABLE 3

|  | Sample 5 | Sample 6 | Sample 7 |
|---|---|---|---|
| A-C 573 | 5 | | |
| A-C 575 | | 5 | |
| A-C 597 | | | 5 |
| Licocene PP 1502 | 25 | 25 | 25 |
| Arkon P 100 | 35 | 35 | 35 |
| Vestoplast 828 | 34.7 | 34.7 | 34.7 |
| Irganox 1010 | 0.3 | 0.3 | 0.3 |
| Average (x = 5) heat stress cleavage | 77.8 | 79.6 | 108.2 |
| Viscosity cP @ 170° C. | 4720 | 5130 | 5140 |
| @ 180° C. | 3640 | 3950 | 3840 |

Results show that the maleated polypropylene used in Sample 7 has a greater influence on increase of heat resistance than the maleated polyethylene use in the Sample 5 and 6 formulations.

Example 4

Hot melt adhesive formulations having the ingredients shown in Table 4 where prepared and heat resistance compared.

TABLE 4

|  | Sample 8 | Sample 9 |
|---|---|---|
| A-C 597 | | 5 |
| Licocene PP 2602 | 14.3 | 14.3 |
| Licocene PP 6102 | 10.6 | 10.6 |
| Arkon P 100 | 40 | 40 |
| Vestoplast 828 | 30.1 | 30.1 |
| Evernox-10 | 0.3 | 0.3 |
| Average (x = 4) heat stress cleavage | 64.25 | 108 |

Results show that in the presence of maleated polyolefin (Sample 9), there was a significant increase in heat resistance.

Example 5

Hot melt adhesive formulations having the ingredients shown in Table 5 where prepared and heat resistance compared.

TABLE 5

|  | Sample 10 | Sample 11 |
|---|---|---|
| A-C 596 | | 1 |
| Licocene PP 2602 | 15.5 | 15.2 |
| Licocene PP 6102 | 11.9 | 11.7 |
| Arkon P 100 | 41.2 | 40.9 |
| Vestoplast 828 | 31.4 | 31.2 |
| Evernox-10 | 0.4 | 0.4 |
| Average (x = 4) heat stress cleavage | 57.5 | 95 |

Results show that in the presence of maleated polyolefin (Sample 11), there was a significant increase in heat resistance.

Example 6

Hot melt adhesive formulations having the ingredients shown in Table 6 where prepared and heat resistance compared.

TABLE 6

|  | Sample 12 | Sample 13 | Sample 14 | Sample 15 | Sample 16 |
|---|---|---|---|---|---|
| Sasolwax H1 | 5.0 | 5.0 | 5.0 | 5.0 | 5.0 |
| Sasolwax 6805 | 15 | 15 | 15 | 15 | 15 |
| Evernox 10 | 0.1 | 0.1 | 0.1 | 0.1 | 0.1 |
| Escorez 5400 | 20 | 20 | 20 | 20 | 20 |
| Kristalex F85 | 20 | 20 | 20 | 20 | 20 |
| EVA 400-28 | 20 | 20 | 20 | 20 | 20 |
| EVA 25-28 | 20 | 20 | 20 | 20 | 20 |
| A-C 573 | | 3 | | | |
| A-C 575 | | | 3 | | |
| A-C 596 | | | | 3 | |
| A-C 597 | | | | | 3 |
| Average (X = 4) cleavage heat stress results | 46 | 55.5 | 59.5 | 55.0 | 58.8 |
| Viscosity (cP) @180° C. | 2950 | 2700 | 2910 | 2785 | 2870 |

Results show that will heat addition of maleated polyolefin additive (Samples 13-16) increased heat resistance of a conventional EVA based adhesive.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

The invention claimed is:
1. A hot melt adhesive consisting essentially of:
   (a) from 20 to 75 wt % of a mixture wherein the mixture comprises (i) from 10 to 50 wt % of a crystalline metallocene polypropylene copolymer component that has a viscosity range of about 60 to about 7000 cP at 170° C. and (ii) from 20 to 50 wt % of an amorphous α-olefin polymer component
   (b) from 0.1 to 15 wt % of a functionalized polyolefin;
   (c) from 20 to 60 wt % of a tackifier;
   (d) from 5 to 40 wt% of a wax that has a melt temperature between 49° C. and 121° C.; and
   (e) from 0.1 to 1.5 wt % of a stabilizer or antioxidant wherein the adhesive has a viscosity range of from about 700 cP to about 10,000 cP at 180° C. and the adhesive has a heat stress cleavage improvement of at least 10° C. over an adhesive without the functionalized polyolefin and wherein the wt % is based on the total weight of the adhesive.

2. The adhesive of claim 1 wherein the functionalized polyolefin is a maleated polypropylene wherein the adhesive has a heat stress cleavage improvement of at least 37° C. over an adhesive without the functionalized polyolefin.

3. An article of manufacture comprising the adhesive of claim 1.

4. The hot melt adhesive of claim 1 wherein the functionalized polyolefin is present from 0.5 to 10 wt %.

5. The hot melt adhesive of claim 1 wherein the adhesive has a heat stress cleavage improvement of at least 40° C. over an adhesive without the functionalized polyolefin.

6. The article of manufacture comprising the adhesive of claim 2.

7. The article of claim 6 which is a nonwoven article.

8. The hot melt adhesive of claim 1 wherein the wax has a melt temperature between 82° C. and 104° C.

* * * * *